United States Patent Office 3,124,472
Patented Mar. 10, 1964

3,124,472
USE OF 6,6'-ALKYLIDENEBIS(BENZOXAZINES) FOR IMPROVING PHYSICAL PROPERTIES OF CLAYS AND CLAY-CONTAINING SOILS AND COMPOSITIONS RESULTING THEREFROM
John B. Hemwall, Long Beach, Calif., assignor to The Dow Chemical Company, Midland, Mich., a corporation of Delaware
No Drawing. Filed Apr. 24, 1961, Ser. No. 104,784
10 Claims. (Cl. 106—84)

This invention concerns compositions and methods for the treatment of clays and clay-containing soils having at least 5 weight percent clay, dry basis, with a 6,6'-alkylidenebis(2H-1,3-benzoxazine) compound (hereafter 6,6'-ABB compound) having the formula:

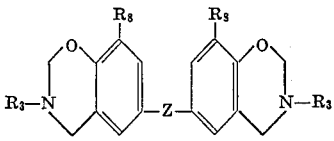

in which $R_3$ is a member of the group consisting of alkyl and cycloalkyl groups containing up to 12 carbon atoms; $R_8$ is a member of the group consisting of H, Cl and $CH_3$; and Z is a member of the group consisting of cyclohexylidene and 3 to 9 carbon alkylidene groups. The invention particularly concerns treating clays and clayey soils for use in making strong and structurally stable roadways and clay-derived structural materials, and for the controlled fracturing of crust-forming soils in agriculture.

Clays and clay-containing materials are found naturally in various geological deposits, including soil. These materials have the properties of being dimensionally unstable and of forming fluid cohesive and adhesive mixtures in the presence of water. Conversely, upon drying, these materials become extremely stress resistant. While many of the uses of clays, clay soils and other clay-containing materials depend upon these properties, there are several uses for which such properties are a distinct handicap or even a complete bar.

Thus, when clays and clay-containing soils are used as integral constituents of the foundation, grade, base or structure in the construction of highways, runways, dams and buildings, the problem often arises that the clay-containing material loses a significant portion of its strength or load-bearing capacity in the presence of moisture or water. This is true even of materials which have been treated with common solidifying agents such as Portland cement or lime.

Clay-containing soils which have been exposed to rain or irrigation water and subsequently dried often will form crusts through which plant penetration is very difficult or impossible.

In the past it has been the practice to avoid the use of these clay-containing materials, to compensate for their shortcomings by other methods, or to use them in spite of their shortcomings. Thus, in the construction industry where it is desired to make use of local soils or aggregate, the presence of excessive amounts of clay in these materials has necessitated the hauling in of materials from other locations. This operation is expensive and, furthermore, suitable materials are frequently scarce. Another alternative has been to process the clay-containing aggregate so as to remove the clay. Again, this is an expensive procedure and is not always practical. Other alternative procedures involve using engineering techniques such as reinforced concrete, extra thick bases and grades, and pilings to compensate for the inferior properties of the clay-containing materials. These techniques, however, also are expensive. The final alternative is to maintain construction costs at a minimum and to use the inferior clay-containing materials. This, of course, results in increased maintenance costs throughout the years.

For agricultural purposes, it is impossible to avoid the use of a clay-containing soil where it exists, except to retire it from agricultural production. Frequently, however, the crusting problem with such soils is mitigated by the use of crops which are more capable of penetrating through crusts, or by planting several seeds together so that by their combined effort at least one plant will emerge, or by transplanting seedlings, in which case the plant does not need to penetrate the crusted soil surface. In many cases these are quite satisfactory solutions to the crusting problem. In other cases, however, these techniques impose restrictions on the grower that he would prefer to avoid. The other alternative used, of course, is to proceed in the hope that conditions necessary to crust formation do not occur before the plants have penetrated the soil surface. While this is frequently the case, there are numerous times when it is not, and severe losses to the farmer result. Thus, there is a definite need for clay, clay soils and other clay-containing materials for use as structural material precursors which, in the presence of water, have the properties of enhanced dimensional stability and of forming less cohesive and adhesive fluid mixtures, but which, when dried, have the property of less stress resistance than such soils or materials when untreated. Such treated clays, soils and other clay-containing materials can be considered to be less water sensitive than the corresponding untreated materials.

This invention is concerned with the treatment of clays and clay-containing soils having at least 5 weight percent, dry basis, of a naturally occurring clay, e.g., of the kaolinitic, montmorillonitic, illitic or mixed layer type, with a 6,6'-ABB compound, as specified above, in an amount ranging between about 0.0025 and 2 weight percent, dry clay basis, to improve their physical properties, whether for structural purposes or for agricultural purposes. An auxiliary solidifying or bonding agent such as lime, asphalts (black to dark brown solid or semisolid cementitious hydrocarbons which gradually liquefy when heated, the predominant constituents of which are bitumens), sodium silicates having a silica to soda ratio ($SiO_2:Na_2O$) in the range of 1.69:1 to 3.90:1 or Portland cement in amount from 1 to 100 weight percent, clay basis, is advantageous in making structural materials.

By way of illustration, the following sorts of 6,6'-ABB compounds can be used in the practice of this invention:

6,6'-isopropylidenebis(3-butyl-3,4-dihydro-2H-1,3-benzoxazine)
6,6'-isopropylidenebis(3-dodecyl-3,4-dihydro-2H-1,3-benzoxazine)
6,6'-isopropylidenebis(3-cyclohexyl-3,4-dihydro-2H-1,3-benzoxazine)
6,6'-isopropylidenebis(8-chloro-3,4-dihydro-2H-1,3-benzoxazine)
6,6'-isopropylidenebis(3-cyclohexyl-3,4-dihydro-8-methyl-2H-1,3-benzoxazine)
6,6'-sec-butylidenebis(3-cyclohexyl-3,4-dihydro-2H-1,3-benzoxazine)
6,6'-cyclohexylidenebis)3-cyclohexyl-3,4-dihydro-2H-1,3-benzoxazine)

They may be prepared following procedures shown in U.S. Patent 2,825,728, issued March 4, 1958.

The 6,6'-ABB compound can be applied to the clay or clay-containing soil in several ways. The preferred way involves dispersing the 6,6'-ABB compound either as a suspension or as a solution in a liquid medium and admixing the resulting liquid dispersion with the clay or clay-containing material via spraying, slurrying or other suitable methods. Suitable liquids for dispersion have a boiling point up to ca. 150° C. and include water, ketones, alcohols and hydrocarbon solvents, mixtures thereof and emulsions thereof, either oil-in-water or water-in-oil.

Because of the diverse natures of the 6,6'-ABB compounds utilized in the practice of this invention, some types are soluble, dispersible or emulsifiable in relatively hydrophilic media, others in relatively hydrophobic media. Upon inspection of a chemical formula, the art skilled can generally determine a solvent, dispersion medium or emulsifier satisfactory for a given 6,6'-ABB compound. In any event, the operability and desirability of a given solvent, dispersion medium or emulsifying agent can be determined by a simple test wherein a given 6,6'-ABB compound is dissolved, suspended or its solution emulsified in a given medium. Obviously, solvents, diluents and emulsifying agents are used which are inert toward the 6,6'-ABB compound. Hereinafter, such solutions, suspensions and emulsions will sometimes be referred to broadly as dispersions and the solvent, suspension and emulsion media will be referred to broadly as dispersion media. Advantageously, the 6,6'-ABB compound dispersion contains between 0.0025 and 50 weight percent of 6,6'-ABB compound.

The treatment of the clay or clay-containing soil with the 6,6'-ABB compound should result in the clay or clay-containing soil containing at least 0.0025% and advantageously up to 2% by weight of the 6,6'-ABB compound, dry clay basis. The upper limit is essentially economic. The 6,6'-ABB compounds used for agricultural purposes need be applied only to the actual volume of soil being cultivated. Thus, when a 6,6'-ABB compound is used to decrease soil crusting, it is practical to treat only the soil immediately above the seed row. Depending upon how carefully the 6,6'-ABB compound is applied to this restricted volume of soil, anywhere from 0.1 pound to 10 pounds of the 6,6'-ABB compound is sufficient to treat one acre of crop land.

The modulus of rupture test (hereafter MR) is a test to determine the maximum stress that a material will withstand without breaking and is determined by subjecting a rectangular briquette to a bending moment. This test is commonly accepted by soil scientists as a measure of the crusting potential of a soil and, hence, its relative suitability as an agricultural soil. The lower the maximum stress before rupture, the less the crusting potential of the soil.

The MR was determined on an apparatus patterned after that as described and used by L. A. Richards in the Soil Science Society of America Proceedings, 17: 321–323.

In each experiment conducted to obtain the test data, one control was included. The control was prepared exactly analogously to the other treatments except that no 6,6'-ABB compound was used.

The unconfined compressive strength test (hereafter UCS) is a commonly accepted test used by civil engineers to determine the suitability of a soil to resist shear by stresses to which it will be subject.

The UCS test data were obtained with 6,6'-ABB compounds using an unconfined compression testing apparatus manufactured by Soiltest Incorporated, model U–160. The rate of strain on the samples was about 0.07 inch per minute. The maximum stress which the samples could bear prior to failing was used to calculate the UCS of the sample via the method outlined in the manual provided by Soiltest Incorporated, entitled Unconfined Compression Testing of Cohesive Soils, dated 1957.

In each set of determinations conducted to provide the data for the following examples, one control was included. A control was prepared in a manner exactly analogously to the other treatments except that no 6,6'-ABB compound was used.

The following examples describe completely specific embodiments and the best mode contemplated by the inventor for carrying out his invention. They are not to be construed as limiting the invention, which is defined in the claims.

EXAMPLE 1

A series of samples of finely ground, air-dried, slightly acid, clay loam soil was brought up to a moisture content of about 17% by spraying water as a fine mist onto the soil samples while subjecting them to thorough mixing. Various 6,6'-ABB compounds, as indicated in following Table I, were immediately added in series to the soil samples by spraying with and mixing in 5 to 10 ml. of an acetone solution containing 20 mg. of the 6,6'-ABB compound per 100 g. air-dried soil to provide a treated soil containing 200 p.p.m. of 6,6'-ABB compound on a dry soil weight basis.

Once the soil had been treated, it was allowed to stand in the open air for at least two hours and then was dried in an oven at 30° C. overnight. The heated soil was then divided into replicates of 25 to 30 g. each, the excess being disposed of, and placed into two rectangular molds 3.2 cm. wide by 6.4 cm. long. The soil in the molds was then leveled and compacted with a special compacting tool. The compacting tool has a base which covers the leveled soil sample and onto which was dropped a weight of 31.5 g. from a height of 31.5 cm. This weight was dropped repeatedly for six times, after which the soil was flooded with water. After the excess water had drained through the soil, the samples were dried overnight in an oven at 30° C. The resulting briquettes were then tested by the method cited above for their MR.

MR determination, as described above, were carried out on the treated samples and untreated control with the following results:

*Table I*

| 6,6'-ABB compound: | MR in millibars |
|---|---|
| Control | 3717 |
| 6,6' - isopropylidenebis(3 - butyl - 3,4 - dihydro-2H-1,3-benzoxazine) | 1200 |
| 6,6' - isopropylidenebis(3 - dodecyl - 3,4 - dihydro-2H-1,3-benzoxazine) | 1075 |
| 6,6' - isopropylidenebis(3 - cyclohexyl - 3,4-dihydro-2H-1,3-benzoxazine) | 1725 |
| 6,6' - isopropylidenebis(8 - chloro - 3 - cyclohexyl-3,4-dihydro-2H-1,3-benzoxazine) | 2400 |
| 6,6' - isopropylidenebis(3 - cyclohexyl - 3,4-dihydro-8-methyl-2H-1,3-benzoxazine) | 1250 |

EXAMPLE 2

A series of mixtures of 4 g. quantities of Portland cement intimately mixed with 80 g. quantities of a finely ground, air-dried, slightly acid, clay loam soil were prepared. Each such mixture was then brought up to a moisture content of about 17% by spraying water as a fine mist onto the soil while subjecting the soil to additional mixing. Various 6,6'-ABB compounds, as indicated in following Table II, were immediately added to the soil samples by spraying with and mixing in 4 ml. of an acetone solution containing 80 mg. of the 6,6'-ABB compound. This treatment resulted in the soil containing 5% Portland cement and 0.1% 6,6'-ABB compound on a dry soil weight basis.

After the soil samples had been treated, each was placed in a cylindrical molding tube 3 cm. in diameter and compressed from both ends in a hydraulic press at a pressure of 740 p.s.i. until a static condition was attained. Each sample was then immediately ejected from the molding tube and placed in a 100% relative humidity atmosphere to cure for a period of four days, followed by a one-day cure at room humidity. Next, each sample was immersed in water for one day, after which the series was tested for UCS, as described above.

Table II

| 6,6'-ABB compound: | UCS in p.s.i. |
|---|---|
| Control | 49 |
| 6,6' - isopropylidenebis(3 - butyl - 3,4 - dihydro-2H - 1,3 - benzoxazine) | 144 |
| 6,6' - isopropylidenebis(3 - dodecyl - 3,4 - dihydro - 2H - 1,3 - benzoxazine) | 111 |
| 6,6' - isopropylidenebis(3 - cyclohexyl - 3,4 - dihydro - 2H - 1,3 - benzoxazine) | 98 |
| 6,6'-isopropylidenebis(8-chloro - 3 - cyclohexyl-3,4 - dihydro - 2H - 1,3 - benzoxazine) | 80 |
| 6,6' - isopropylidenebis(3 - cyclohexyl - 3,4 - dihydro - 8 - methyl - 2H - 1,3 - benzoxazine) | 179 |

EXAMPLE 3

Several 100 g. samples of another finely ground, air-dried, slightly acid, clay loam soil were brought up to a moisture content of about 17%. Various weights of 6,6'-ABB compound, as indicated, (5 mg., 10 mg., 50 mg., 100 mg.) were dissolved in 10-ml. aliquots of acetone and sprayed with intimate mixing onto separate samples of soil.

The soil was then evaluated by MR determinations, as described above. Results are given in following Table III:

Table III

| 6,6'-ABB Compound | P.p.m. in soil | MR in millibars |
|---|---|---|
| Control | | 5,800 |
| 6,6'-isopropylidenebis(3-butyl-3,4-dihydro-2H-1,3-benzoxazine) | 50 | 3,890 |
| | 100 | 2,920 |
| | 500 | 910 |
| | 1,000 | 530 |

EXAMPLE 4

Several finely ground, air-dried samples of several soils were brought up to the moisture content indicated in following Table IV-A. An amount of 40 mg. of 6,6'-ABB compound dissolved in 10 ml. of acetone was sprayed with intimate mixing onto one sample of each soil. Thus, each soil contained 400 p.p.m. of the test chemical.

The soil was then evaluated by MR determinations, as described above. Results are given in following Table IV-B.

Table IV-A

SOILS USED

| Soil | Mechanical analysis | | | Percent O.M.[1] | pH | Moisture content at treatment in percent |
|---|---|---|---|---|---|---|
| | Sand | Silt | Clay | | | |
| B-1 | 26 | 52 | 22 | 10.7 | 5.3 | 20 |
| D-1 | 42 | 46 | 12 | 1.0 | 6.0 | 7 |
| F-3 | 38 | 36 | 26 | 0.9 | 6.7 | 8 |
| N-1 | 13 | 39 | 48 | 2.7 | 6.8 | 12 |
| L-1 | 5 | 35 | 60 | 2.1 | 7.4 | 18 |

[1] Organic matter.

Table IV-B

| Soil | MR in millibars | |
|---|---|---|
| | 6,6'-ABB Compound [1] | Control |
| B-1 | 310 | 560 |
| D-1 | 260 | 840 |
| F-3 | 210 | 1,720 |
| N-1 | 0 | 2,900 |
| L-1 | 1,580 | 7,120 |

[1] 6,6'-isopropylidenebis(3-butyl-3,4-dihydro-2H-1,3-benzoxazine).

EXAMPLE 5

The procedure of Example 1 was repeated with the indicated 6,6'-ABB compounds with the following results:

Table V

| 6,6'-ABB compound: | MR in millibars |
|---|---|
| Control | 4900 |
| 6,6' - cyclohexylidenebis(3 - cyclohexyl - 2,4-dihydro - 2H - 1,3 - benzoxazine) | 1600 |
| 6,6' - sec - butylidenebis(3 - cyclohexyl - 3,4-dihydro - 2H - 1,3 - benzoxazine) | 2050 |

EXAMPLE 6

The procedure of Example 2 was repeated using another similar soil with the following 6,6'-ABB compounds with the following results:

Table VI

| 6,6'-compound: | UCS in p.s.i. |
|---|---|
| Control | 0 |
| 6,6' - cyclohexylidenebis(3 - cyclohexyl - 3,4 - dihydro - 2H - 1,3 - benzoxazine) | 110 |
| 6,6' - sec - butylidenebis(3 - cyclohexyl - 3,4 - dihydro - 2H - 1,3 - benzoxazine) | 80 |

What is claimed is:

1. The method of treatment of clays and clay-containing soils by admixing therewith a compound having the formula:

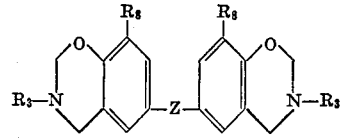

in which $R_3$ is a member of the group consisting of alkyl and cycloalkyl groups containing up to 12 carbon atoms; $R_8$ is a member of the group consisting of H, Cl and $CH_3$; and Z is a member of the group consisting of cyclohexylidene and 3 to 9 carbon alkylidene groups, in amount sufficient to provide at least 0.0025 and up to 2 weight percent of said compound, dry clay basis.

2. A composition of a clay material of the group consisting of clays and clay-containing soils and in admixture therewith at least 0.0025 and up to 2 weight percent, clay basis, of a compound having the formula:

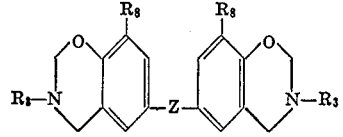

in which $R_3$ is a member of the group consisting of alkyl and cycloalkyl groups containing up to 12 carbon atoms; $R_8$ is a member of the group consisting of H, Cl and $CH_3$; and Z is a member of the group consisting of cyclohexylidene and 3 to 9 carbon alkylidene groups.

3. The composition of claim 2 wherein the clay material contains at least 5 weight percent clay, dry basis, and from 1 to 100 weight percent of at least one member of the group consisting of Portland cement, lime, asphalts and sodium silicates, dry clay basis.

4. The composition of claim 2 wherein the compound is 6,6' - isopropylidenebis (3 - butyl - 3,4 - dihydro-2H-1,3-benzoxazine).

5. The composition of claim 2 wherein the compound is 6,6'-isopropylidenebis(3-dodecyl-3,4-dihydro - 2H - 1,3-benzoxazine).

6. The composition of claim 2 wherein the compound is 6,6'-isopropylidenebis(3-cyclohexyl-3,4-dihydro-2H-1,3-benzoxazine).

7. The composition of claim 2 wherein the compound is 6,6'-isopropylidenebis(8 - chloro - 3,4 - dihydro-2H-1,3-benzoxazine).

8. The composition of claim 2 wherein the compound is 6,6'-isopropylidenebis(3-cyclohexyl-3,4-dihydro-8-methyl-2H-1,3-benzoxazine).

9. The composition of claim 2 wherein the compound is 6,6'-sec-butylidenebis(3-cyclohexyl-3,4-dihydro-2H-1,3-benzoxazine).

10. The composition of claim 2 wherein the compound is 6,6'-cyclohexylidenebis(3-cyclohexyl-3,4-dihydro-2H-1,3-benzoxazine).

References Cited in the file of this patent

UNITED STATES PATENTS

| | | |
|---|---|---|
| 1,882,377 | Whittelsey | Oct. 11, 1932 |
| 2,768,089 | Erickson | Oct. 23, 1956 |
| 2,825,728 | Rigterink | Mar. 4, 1958 |